United States Patent [19]

Shibahata et al.

[11] Patent Number: 4,705,131
[45] Date of Patent: Nov. 10, 1987

[54] FOUR-WHEEL STEERING CONTROL SYSTEM FOR VEHICLE

[75] Inventors: Yasuji Shibahata, Yokohama; Yukio Fukunaga, Zushi; Kenji Nakamura, Yokohama; Yasumasa Tsubota, Yokosuka; Namio Irie; Junsuke Kuroki, both of Yokohama, all of Japan

[73] Assignee: Nissan Motor Co., Ltd., Yokohama, Japan

[21] Appl. No.: 695,345

[22] Filed: Jan. 28, 1985

[30] Foreign Application Priority Data

Jan. 31, 1984 [JP] Japan .................. 59-15342

[51] Int. Cl.$^4$ .................. B62D 5/04; B62D 5/06
[52] U.S. Cl. .................. 180/140; 180/141; 180/142; 180/143; 280/91
[58] Field of Search ............. 180/140, 141, 142, 143, 180/79, 79.1; 280/91; 364/424; 74/388 P, 388 S; 60/385, 386; 91/536; 92/117 R, 117 A, 7, 131

[56] References Cited

U.S. PATENT DOCUMENTS

| | | | |
|---|---|---|---|
| 4,105,086 | 8/1978 | Ishii et al. | 180/79 |
| 4,373,603 | 2/1983 | Nelson | 180/140 X |
| 4,412,594 | 11/1983 | Furukawa et al. | 180/142 X |
| 4,418,780 | 12/1983 | Ito et al. | 180/142 |
| 4,440,254 | 4/1984 | Shibahata et al. | 180/142 |
| 4,441,572 | 4/1984 | Ito et al. | 180/143 X |

FOREIGN PATENT DOCUMENTS 58-20565  2/1983  Japan .

Primary Examiner—John J. Love
Assistant Examiner—Mitchell J. Hill
Attorney, Agent, or Firm—Leydig, Voit & Mayer

[57] ABSTRACT

A vehicle steering control system for steering both front and rear wheels is so arranged that a transfer function between a driver's steering input and a front wheel steering angle, and a transfer function between the steering input and a rear wheel steering angle are differentiated from each other so as to obtain an optimum cornering characteristic of the vehicle. The system has a steering input sensor, a vehicle speed sensor, means for determining the transfer function for the front wheels from a steering frequency and a vehicle speed, means for determining the transfer function of the rear wheels, a front wheel actuator for steering the front wheels, and a rear wheel actuator for steering the rear wheels. The means for determining the transfer function of the rear wheels may be an electronic circuit, or a hydraulic fluid flow restrictor such as an orifice, or a mechanical gearing.

24 Claims, 23 Drawing Figures

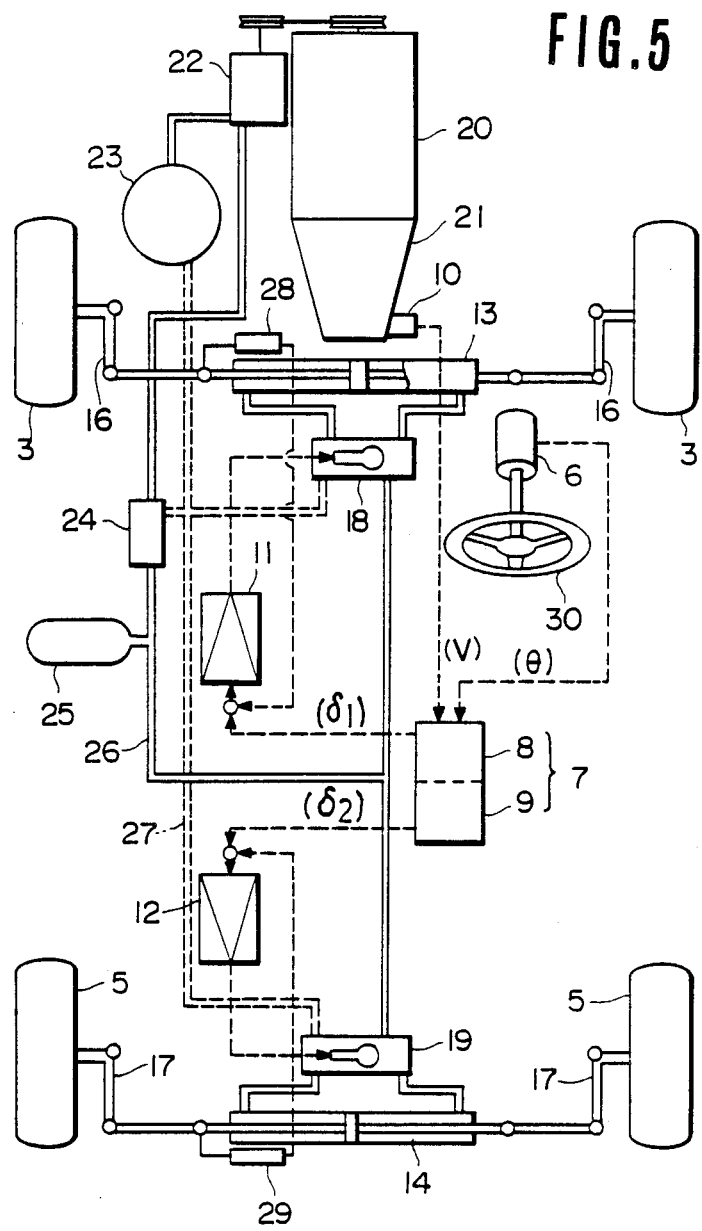

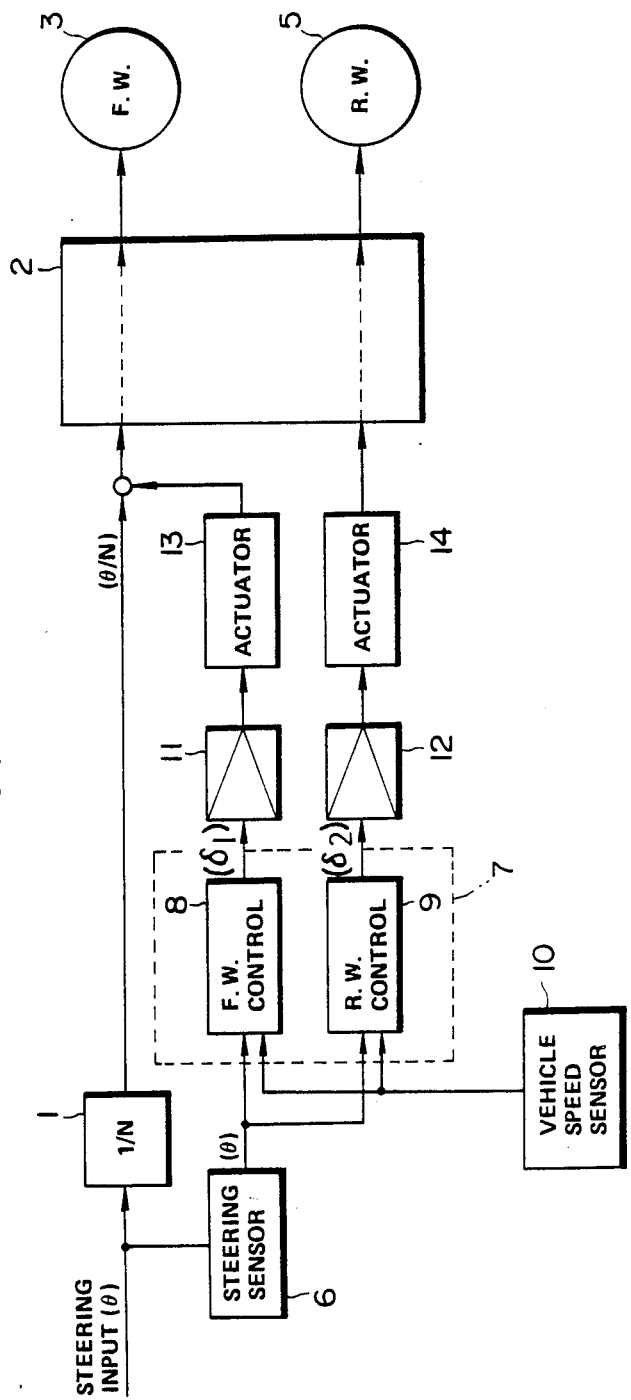

FOUR-WHEEL STEERING CONTROL SYSTEM FOR VEHICLE

BACKGROUND OF THE INVENTION

The present invention relates to a control system for steering both pair of front wheel and rear wheels of a vehicle such as a motor vehicle in accordance with a driver's steering input.

One conventional example of the four-wheel steering system is disclosed in Japanese patent provisionally published application No. 58-20565. In this system, both of the front and rear wheels are steered through steering gear mechanisms. The transfer function between the steering input produced by the driver and the front wheel steering angle, and the transfer function between the steering input and the rear wheel steering angle are both determined by the steering gear mechanism only as a result, the most desired steering characteristic of the vehicle cannot be obtained.

SUMMARY OF THE INVENTION

It is an object of the present invention to provide a four-wheel steering control system which can steer the front and rear wheels individually in accordance with respective transfer characteristics so differentiated as to provide a desired steering response characteristic of the vehicle.

According to the present invention, the control system comprises steering input means, front steering means and rear steering means. The input means is adapted to be operated manually for determining a steering input indicative of a driver's steering command. The front steering means is connected with the input means for determining a first output angle from the steering input in accordance with a first transfer characteristic between the steering input and the first output angle, and controlling a steering angle of the front wheels so that the steering angle of the front wheels is maintained equal to the first output angle. The rear steering means is connected with the input means for determining a second output angle from the steering input in accordance with a second transfer characteristic between the steering input and the second output angle, which is different from the first transfer characteristic, and controlling a steering angle of the rear wheels so that the steering angle of the rear wheels is maintained equal to the second output angle.

BRIEF DESCRIPTION OF THE DRAWINGS

FIG. 5 is a schematic plan view of the system of the first embodiment, FIG. 6 is a schematic view of a four-wheel steering system of a second embodiment of the present invention.

DETAILED DESCRIPTION OF THE INVENTION

Figures 1, 2:
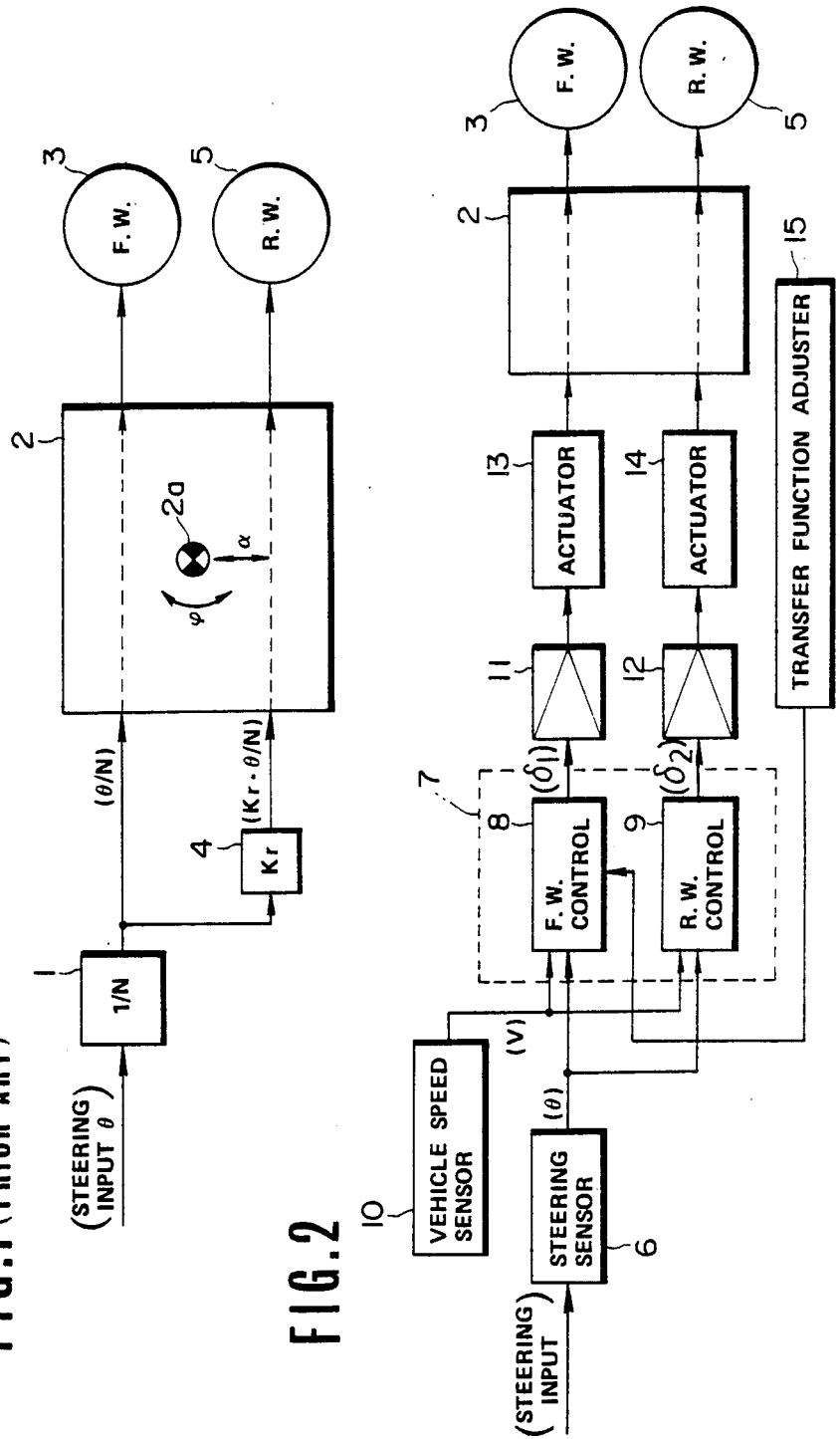
FIG. 1 is a schematic view of a conventional type four-wheel steering system.
FIG. 2 is a schematic view of a four-wheel steering control system of a first embodiment of the present invention.

FIG. 1 shows a four-wheel steering system of a conventional type as disclosed in Japanese Patent provisionally published application, provisional publication No. 58-20565. In this system, a steering input (which is a driver's steering command and which is usually a steering angle or angular displacement $\Theta$ of a steering wheel) is transmitted through a steering gear 1 to front road wheels 3 of a vehicle 2, and simultaneously to rear road wheels 5 through a rear wheel steering mechanism 4. A steering angle of the front wheels 3 is maintained equal to a steering gear ratio $1/N$ of the steering gear 1 times the steering input $\Theta$, while at the same time a steering angle of the rear wheels 5 is maintained equal to a gear ratio $Kr$ of the rear steering mechanism 4 times the gear ratio $1/N$ of the steering gear 1 times the steering input $\Theta$. That is, a transfer characteristic between the steering input and the front wheel steering angle and a transfer characteristic between the steering input and the rear wheel steering angle are fixed and substantially identical to each other from the viewpoint of an analysis of a turning movement of a wheeled vehicle. Therefore, this system cannot steer the front wheels and rear wheels individually in accordance with respective transfer characteristics and cannot provide a satisfactory cornering characteristic and steering stability of a vehicle.

The present invention is based on the following consideration.

A turning movement of a wheeled vehicle is basically planar, and generally described by a yaw rate or yaw angular velocity ($\dot{\phi}$) and a lateral acceleration ($\alpha$) of the vehicle. The yaw rate is the time rate of change of angular displacement of the vehicle about a vertical axis through the center of gravity $2a$ of the vehicle 2. The lateral acceleration is an acceleration of the center of gravity $2a$ along a lateral axis of the vehicle.

A movement of a vehicle having steerable front and steerable rear wheels is determined by the sum of a turning behavior due to a yaw rate $\dot{\phi}_1$ and a lateral acceleration $\alpha_1$ which are both caused by a steering angle $\delta_1$ of the front wheels, and a turning behavior due to a yaw rate $\dot{\phi}_2$ and a lateral acceleration $\alpha_2$ which are both caused by a steering angle $\delta_2$ of the rear wheels. Therefore, a total yaw rate $\dot{\phi}$ and a total lateral acceleration $\alpha$ of the vehicle are expressed as follows:

$$\dot{\phi}=\dot{\phi}_1+\dot{\phi}_2 \qquad (1)$$

$$\alpha=\alpha_1+\alpha_2 \qquad (2)$$

By using a transfer function $H_1(s)$ between the front wheel steering angle $\delta_1$ and the yaw rate $\dot{\phi}_1$ produced by this steering angle, a transfer function $G_1(s)$ between the front wheel steering angle $\delta_1$ and the lateral acceleration $\alpha_1$ produced by this steering angle, and similar transfer functions $H_2(s)$ and $G_2(s)$ relating the rear wheel steering angle $\delta_2$, respectively, to the resultant yaw rate $\dot{\phi}_2$ and lateral acceleration $\alpha_2$, the quantities $\dot{\phi}_1, \dot{\phi}_2, \alpha_1, \alpha_2$ can be expressed, respectively, as follows:

$$\dot{\phi}_1=\delta_1 \cdot H_1(s) \qquad (3)$$

$$\dot{\phi}_2=\delta_2 \cdot H_2(s) \qquad (4)$$

$$\alpha_1=\delta_1 \cdot G_1(s) \qquad (5)$$

$$\alpha_2=\delta_2 \cdot G_2(s) \qquad (6)$$

From the expression (1) to (6), the total yaw rate $\dot{\phi}$ and the total lateral acceleration $\alpha$ are:

$$\dot{\phi}=\delta_1 \cdot H_1(s)+\delta_2 \cdot H_2(s) \qquad (7)$$

$$\alpha=\delta_1 \cdot G_1(s)+\delta_2 \cdot G_2(s) \qquad (8)$$

By expressing a transfer function between the steering input $\Theta$ and the front wheel steering angle $\delta_1$, and a transfer function between the steering input $\Theta$ and the rear wheel steering angle $\delta_2$, respectively, as $X_1(s)$ and $X_2(s)$, the front and rear wheel steering angles $\delta_1$ and $\delta_2$ are expressed as follows:

$$\delta_1=\Theta \cdot X_1(s) \qquad (9)$$

$$\delta_2=\Theta \cdot X_2(s) \qquad (10)$$

Substitution of the front and rear wheel steering angles $\delta_1$ and $\delta_2$ expressed by the equations (9) and (10) into the equations (7) and (8) gives:

$$\dot{\phi}=\Theta \cdot X_1(s) \cdot H_1(s)+\Theta \cdot X_2(s) \cdot H_2(s) \qquad (11)$$

$$\alpha=\Theta \cdot X_1(s) \cdot G_1(s)+\Theta \cdot X_2(s) \cdot G_2(s) \qquad (12)$$

It would be ideal if a vehicle could be steered in such a characteristic that there were neither phase lead nor phase lag of the behavior of the vehicle with respect to the steering input, and the gain of the vehicle such as a yaw rate gain would neither increase nor decrease with variation of the steering input. Therefore, it can be considered that satisfactory characteristics of the yaw rate and lateral acceleration can be obtained if the front and rear wheel steering angles are controlled so as to satisfy the following equations.

$$\dot{\phi}/\Theta=\dot{\phi}_0 \text{ (constant)} \qquad (13)$$

$$\alpha/\dot{\phi}=\alpha_0 \text{ (constant)} \qquad (14)$$

It is possible to determine the transfer functions $X_1(s)$ and $X_2(s)$ by using the equations (13) and (14).

Division of both sides of the equations (11) and (12) by $\Theta$ gives:

$$\dot{\phi}/\Theta=\dot{\phi}_0=X_1(s)\cdot H_1(s)+X_2(s)\cdot H_2(s) \qquad (15)$$

$$\alpha/\Theta=\alpha_0=X_1(s)\cdot G_1(s)+X_2(s)\cdot G_2(s) \qquad (16)$$

From the equations (15) and (16), the transfer functions $X_1(s)$ and $X_2(s)$ are:

$$X_1(s) = \frac{\begin{vmatrix} \dot{\phi}_0 & H_2(s) \\ \alpha_0 & G_2(s) \end{vmatrix}}{\begin{vmatrix} H_1(s) & H_2(s) \\ G_1(s) & G_2(s) \end{vmatrix}} = \frac{\dot{\phi}_0 \cdot G_2(s) - \alpha_0 \cdot H_2(s)}{H_1(s) \cdot G_2(s) - H_2(s) \cdot G_1(s)} \qquad (17)$$

$$X_2(s) = \frac{\begin{vmatrix} H_1(s) & \dot{\phi}_0 \\ G_1(s) & \alpha_0 \end{vmatrix}}{\begin{vmatrix} H_1(s) & H_2(s) \\ G_1(s) & G_2(s) \end{vmatrix}} = \frac{\alpha_0 \cdot H_1(s) - \dot{\phi}_0 \cdot G_1(s)}{H_1(s) \cdot G_2(s) - H_2(s) \cdot G_1(s)} \qquad (18)$$

In the equations (17) and (18), each of the transfer functions $H_1(s)$, $H_2(s)$, $G_1(s)$ and $G_2(s)$ is known per se. For example, Masato Abe "Sharyo no Undo to Seigyo (Movement and Control of Vehicle)" Kyoritsu Shuppan Kabushiki Kaisha, discloses these transfer functions. The description of this publication necessary to determine these transfer functions is hereby incorporated by reference. Thus, the transfer functions $H_1(s)$, $H_2(s)$, $G_1(s)$ and $G_2(s)$ can be determined easily, so that the transfer functions $X_1(s)$ and $X_2(s)$ to obtain the desired values $\dot{\phi}_0$, $\alpha_0$ can be determined from the equations (17) and (18).

Figure 18A:
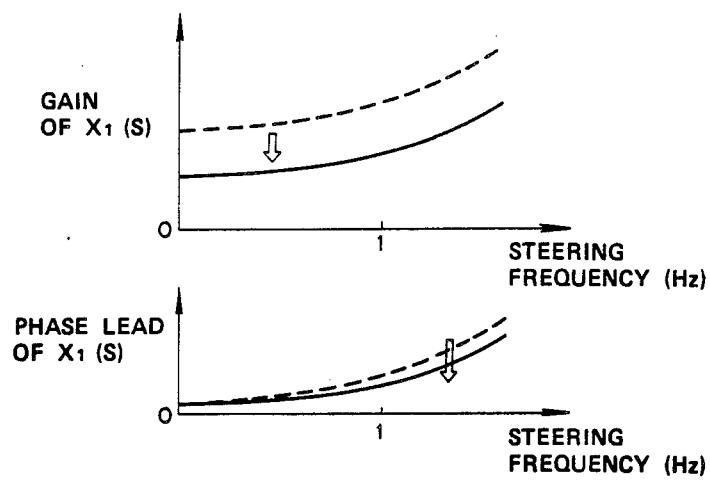
FIGS. 18A and 18B are diagrams showing ideal transfer functions for the front wheels and rear wheels.
Figure 18B:
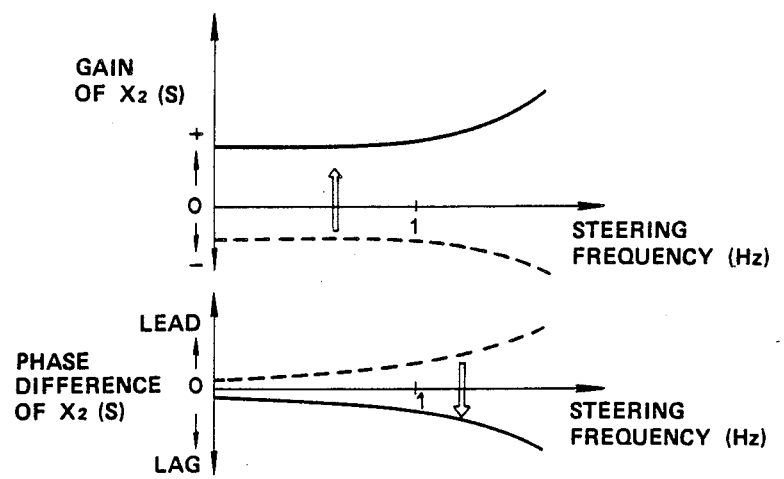

Because each of the transfer functions is a function of a steering frequency, the sign s of each transfer function can be replaced by $Jw$, provided that $J$ is an imaginary number, and $w$ is the steering frequency. Therefore, the transfer functions $X_1(s)$ and $X_2(s)$ obtained from the equations (17) and (18) provide frequency response characteristics of both gain and phase difference as shown in FIGS. 18A and 18B.

As is known, each of the transfer functions $H_1(s)$, $H_2(s)$, $G_1(s)$ and $G_2(s)$ is a function of the vehicle speed. Accordingly, each characteristic of FIGS. 18A and 18B changes from a broken line curve to a solid line curve with increase of the vehicle speed as shown by an arrow. As shown in FIG. 18A, both of the gain and the phase lead of $X_1(s)$ decrease when the vehicle speed increases. The gain of $X_2(s)$ changes from a negative side to a positive side with increase of the vehicle speed, as shown in FIG. 18B. The phase difference of $X_2(s)$ changes from a phase lead side to a phase lag side with increase of the vehicle speed as shown in FIG. 18B.

A first embodiment of the present invention is shown in FIG. 2. A control system of the first embodiment for steering a vehicle 2 through front wheels 3 and rear wheels 5 has a steering sensor 6 which senses a steering input produced by a driver. The steering input is an angular displacement $\Theta$ of a steering wheel of the vehicle 2, for example. The steering sensor 6 is connected to a control unit 7 which has a front wheel steering angle control circuit 8 and a rear wheel steering angle control circuit 9. Both circuits of the control unit 7 receives a signal of a vehicle speed sensor 10 as well as a signal of the steering input sensor 6. The vehicle speed sensor 10 senses a speed V of the vehicle 2. The control unit 7 determines the above-mentioned transfer functions $H_1(s)$, $H_2(s)$, $G_1(s)$ and $G_2(s)$ from the vehicle speed V sensed by the vehicle speed sensor 10 and a steering frequency based on the steering input $\Theta$. By using these transfer functions, the front wheel steering angle control circuit 8 determines first transfer function $X_1(s)$ corresponding to the desired values $\phi_0$ and $\alpha_0$ from the above-mentioned equation (17). Then, the front wheel circuit 8 determines the steering angle $\delta_1$ of the front wheels 3 from the above mentioned equation (9) by use of $X_1(s)$ and the steering input $\Theta$. Similarly, the rear wheel steering angle control circuit 9 determines a second transfer function $X_2(s)$ corresponding to the desired values $\phi_0$ and $\alpha_0$ from the equation (18), and then determines the steering angle $\delta_2$ of the rear wheels 5 from the equation (10).

An output signal of the circuit 8, representing a first output angle equal to the front wheel steering angle $\delta_1$, is sent to a front wheel actuator 13 through an amplifier 11 for amplifying the signal. An output signal of the circuit 9, representing a second output angle equal to the rear wheel steering angle $\delta_2$ is sent to a rear wheel actuator 14 through an amplifier 12. The actuator 13 steers the front wheels 3 through the determined steering angle $\delta_1$ in accordance with the output signal of the circuit 8. The actuator 14 steers the rear wheels 5 through the determined steering angle $\delta_2$ in accordance with the output signal of the circuit 9. Thus, the vehicle 2 is steered through both the front and rear wheels so that the desired values $\phi_0$ and $\alpha_0$ expressed by the equations (13) and (14) can be obtained. Consequently, the steering control system of the first embodiment can improve the vehicle stability and control (or directional control characteristics) remarkably, and make an ideal four-wheel steering possible.

Figure 3A:
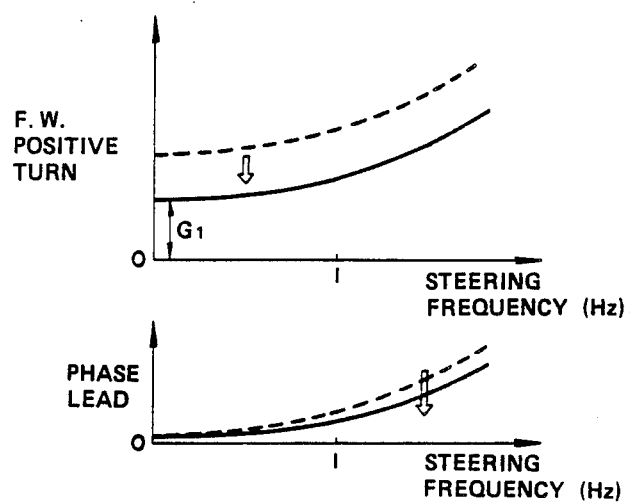
FIGS. 3A and 3B are diagrams showing response characteristics of the front and rear wheels of the first embodiment.
Figure 3B:
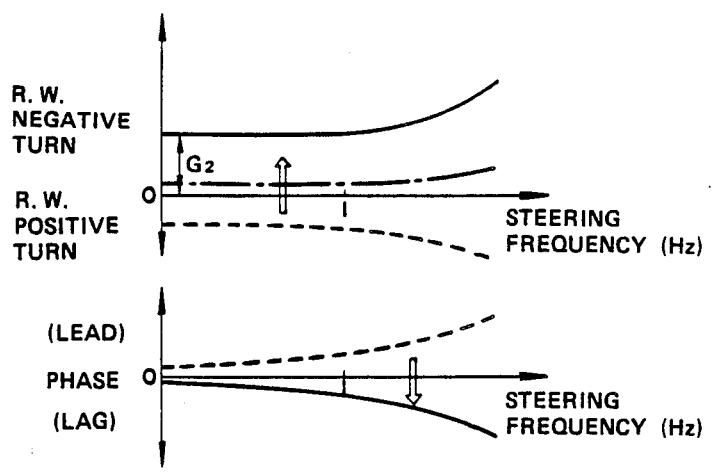

This control system employs the transfer functions $X_1(s)$ and $X_2(s)$ as shown in FIGS. 18A and 18B. Therefore, the response characteristic of the front wheel steering angle is determined by $X_1(s)$, as shown in FIG. 3A. Each characteristic curve of FIG. 3A changes from a broken line to a solid line when the vehicle speed becomes high. As shown, the front wheels 3 are turned in such a positive direction as to increase a direction change of the vehicle. An amount of a turn of the front wheels in the positive direction is decreased as the steering frequency decreases, or as the vehicle speed increases. The response of the front wheels 3 leads the steering input, and the phase lead of the front wheels 3 with respect to the steering input is decreased as the steering frequency decreases or as the vehicle speed increases. The response characteristic of the rear wheel steering angle is determined by $X_2(s)$, as shown in FIG. 3B. Each characteristic curve of FIG. 3B changes from a broken line to a solid line when the vehicle speed becomes high. When the vehicle speed is low, the rear wheels 5 are turned in the positive direction to increase the direction change of the vehicle. (That is, the rear wheels 5 are turned in a direction opposite to a turn direction of the front wheels 3 with respect to a longitudinal line of the vehicle). When the vehicle speed is high, the rear wheels 5 are turned in such a negative direction as to decrease a direction change of the vehicle. (That is, the rear wheels 5 are turned in the same direction as the front wheels 3 are turned). The response of the rear wheels 5 leads the steering input when the vehicle speed is low, and lags the steering input when the vehicle speed is high.

Figure 4A:
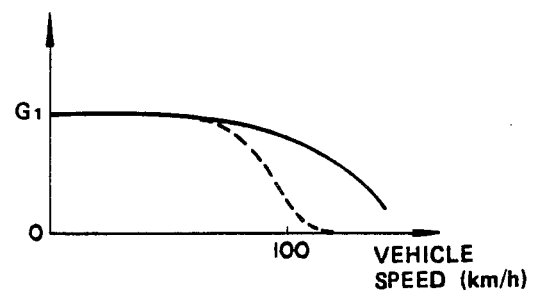
FIGS. 4A and 4B are diagrams showing characteristics of the stationary gains shown in FIGS. 3A and 3B.
Figure 4B:
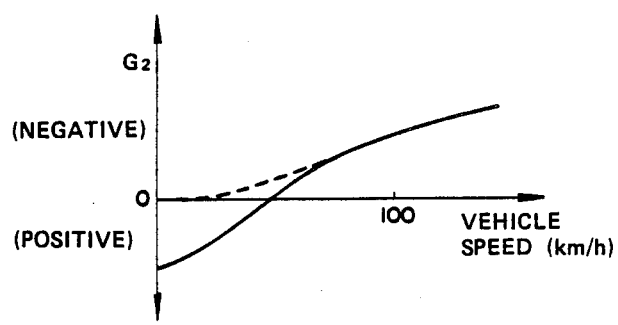

In FIGS. 3A and 3B, $G_1$ and $G_2$ are, respectively, values (stationary gains) of the gains of the front wheels 3 and rear wheels 5 when the steering frequency is approximately zero. The values $G_1$ and $G_2$ vary with the vehicle speed as shown in FIGS. 4A and 4B. As shown by a solid line in FIG. 4A, the amount of a turn of the front wheels 3 in the positive direction decreases when the vehicle speed becomes high. The amount of a turn of the rear wheels 5 in the positive or negative direction is varied as shown by a solid line in FIG. 4B. A broken line of FIG. 4A shows a characteristic obtained when the control of the amount of a turn of the front wheels in the positive direction based on the vehicle speed is not performed. A broken line of FIG. 4B shows a characteristic obtained when the rear wheels are controlled only in the negative direction without a control in the positive direction. The direction control characteristic of the vehicle can be improved even when the characteristics of the broken lines of FIGS. 4A and 4B are employed.

It is preferable to incorporate a transfer function adjuster 15 for modifying the transfer functions $X_1(s)$ and $X_2(s)$, into the control system of this embodiment, as shown in FIG. 2. A yaw rate gain of the vehicle is determined by the transfer functions $X_1(s)$ and $X_2(s)$. Therefore, the adjuster 15 is arranged to adapt the yaw rate gain of the vehicle to vehicle speed, side wind, weather condition, road condition, acceleration or deceleration of the vehicle, vehicle weight, weight distribution between the front and rear axles, and/or driver's taste, by modifying $X_1(s)$ and/or $X_2(s)$.

When the vehicle speed is employed, the transfer function adjuster 15 is arranged to decrease the yaw rate gain (a ratio of the yaw rate to the steering input) with increase of the vehicle speed in order to improve the vehicle stability at high vehicle speeds. Therefore, the adjuster 15 decreases the transfer function $X_1(s)$ (the amount of a turn of the front wheels in the positive direction) determined by the control circuit 8, and increases the transfer function $X_2(s)$ (the amount of a turn of the rear wheels in the negative direction) determined by the circuit 9, as the vehicle speed increases.

The transfer function adjuster 15 may be arranged to decrease the yaw rate gain by decreasing $X_1(s)$ and increasing $X_2(s)$ when any one or more of conditions of side wind, weather and road surface become worse for the vehicle control and stability. For example, the yaw rate gain is decreased when the side wind becomes stronger, when the weather becomes rainy, or when the road becomes rugged.

It is desirable to decrease the yaw rate gain of the vehicle with increase of the time rate of change of the vehicle speed (acceleration or deceleration of the vehicle) because the tendency to powerslide of the vehicle increases with increase of the vehicle acceleration, and the tendency to tack-in of the vehicle increases with increase of the vehicle deceleration. Therefore, the adjuster 15 may be arranged to decrease $X_1(s)$ and increase $X_2(s)$ as the vehicle acceleration or deceleration increases. When the vehicle weight increases, lateral grip of the tires of the vehicle becomes deficient so that the vehicle control becomes unstable. Therefore, the adjuster 15 may be arranged to decrease the yaw rate gain with increase of the vehicle weight. When the weight on the reat axle increases as compared with the weight on the front axle, the rear of the vehicle tends to slide outwardly under the influence of a centrifugal force produced by a turn of the vehicle. Therefore, the adjuster 15 may be arranged to decrease the yaw rate gain as the weight on the rear axle increases.

It is possible to decrease the yaw rate gain by decreasing the phase lead of $X_1(s)$ and increasing the phase lag of $X_2(s)$, as evident from FIGS. 3A and 3B. Therefore, the adjuster 15 may be arranged to adjust the phase differences in either case.

When a driver's as to response characteristics of the vehicle is to be introduced attitude is employed, the adjuster 15 modifies $X_1(s)$ and $X_2(s)$ so as to adjust the yaw rate gain to a value indicated by a driver's manual operation characteristics.

FIG. 5 shows the control system of FIG. 2 more concretely. Right and left steering linkages 16 supports the right and left front wheels 3, respectively, on a vehicle body so that the front wheels 3 are steerable. Right and left steering linkages 17 support the rear wheels 5, respectively, on the vehicle body so that the rear wheels 5 are also steerable. The front wheel actuator 13 shown in FIG. 2 is interposed between the front steering linkages 16. The rear wheel actuator 14 is interposed between the rear steering linkage 17. Each of the actuators 13 and 14 is a double-acting hydraulic actuator. The actuators 13 and 14 are controlled by servo valves 18 and 19, respectively.

A hydraulic fluid pressure is supplied to the servo valves 18 and 19 by a common hydraulic circuit. An oil pump 22 is driven by an engine 20 which is mounted on the vehicle together with a transmission 21. The oil pump 22 sucks oil from an oil reservoir 23, and discharges the oil to an unload valve 24, which controls the pressure of the oil at a predetermined value and supplies the pressurized oil to an accumulator 25. The oil is supplied from the accumulator 25 to the servo valves 18 and 19 through a supply conduit 26. A return conduit 27 conveys an unnecessary oil from the servo valves 18 and 19 and the unload valve 24.

The steering sensor 6 senses the angular displacement $\Theta$ of the steering wheel 30, and the vehicle speed sensor 10 senses an output rpm of the transmission 21 (vehicle speed V). The front and rear wheel steering angle control circuits 8 and 9 of the control unit 7 receives the steering input $\Theta$ sensed by the steering sensor 6, and the vehicle speed V sensed by the vehicle speed sensor 10, and produces the output electric signals indicative of the front and rear wheel steering angles $\delta_1$ and $\delta_2$, respectively. The output signals of the circuits 8 and 9 are sent, respectively, through the amplifiers 11 and 12 to the servo valves 18 and 19.

In accordance with the output signal of the control circuit 8, the front servo valve 18 supplies the oil of the supply conduit 26 to one of two working chambers of the front wheel actuator 13 and makes the other chamber open to the return conduit 27, so that the piston of the actuator 13 moves in a direction determined by the signal of the control circuit 8, and steers the front wheels 3 in the determined direction. Similarly, the servo valve 19 steers the rear wheels 5 by supplying the oil from the supply conduit 26 to one of two working chambers of the rear wheel actuator 14 in accordance with the signal of the control circuit 9. Front and rear wheel steering angle sensors 28 and 29 sense amounts of angular movements of the front and rear wheels 3 and 5, respectively. An output signal of the front wheel steering angle sensor 28 is compared with the signal of the control circuit 8, and the servo valve 18 stops its control when the sensed amount of the angular displacement of the front wheels 3 is equal to the front wheel steering angle $\delta_1$ determined by the circuit 8. Similarly, the rear servo valve 19 stops its control when the amount of the angular displacement of the rear wheels 5 is equal to the rear wheel steering angle $\delta_2$ determined by the circuit 9. The servo valves 18 and 19 can maintain the angular positions of the front and rear wheels 3 and 5 at the desired steering angles $\delta_1$ and $\delta_2$, respectively, by shutting off the actuator 13 and 14 from both of the supply and return conduits 26 and 27.

A second embodiment of the present invention is shown in FIG. 6. The rear wheel steering system of this embodiment is the same as that of the first embodiment. The front wheel steering system of this embodiment is different from that of the first embodiment in that the front wheels 3 are steered first through a mechanical steering gear 1, and secondly through an electrical control circuit 8 similar to the control circuit 8 of the first embodiment. In the second embodiment, the desired front wheel steering angle $\delta_1$ is attained by a cooperation of the steering mechanism and the control circuit. Unlike the first embodiment, the front wheel steering angle control circuit 8 of the second embodiment uses a value $X_1'$ obtained by subtracting a transfer function $X_1(s)'$ of the front wheel steering mechanism including the steering gear 1 from the transfer function $X_1(s)$ obtained from the above-mentioned equation (17) (i.e. $X_1' = X_1(s) - X_1(s)'$), and determines a corrective steering angle $\delta_1'$ for the front wheels 3 from an equation $\delta_1' = \Theta \cdot X_1'$ which corresponds to the equation (9). The control circuit 8 steers the front wheels 3 through the amplifier 11 and the front wheel actuator 13 in accordance with the determined corrective steering angle $\delta_1'$ in such a manner as to give assistance to the front wheel steering mechanism.

Figure 7:
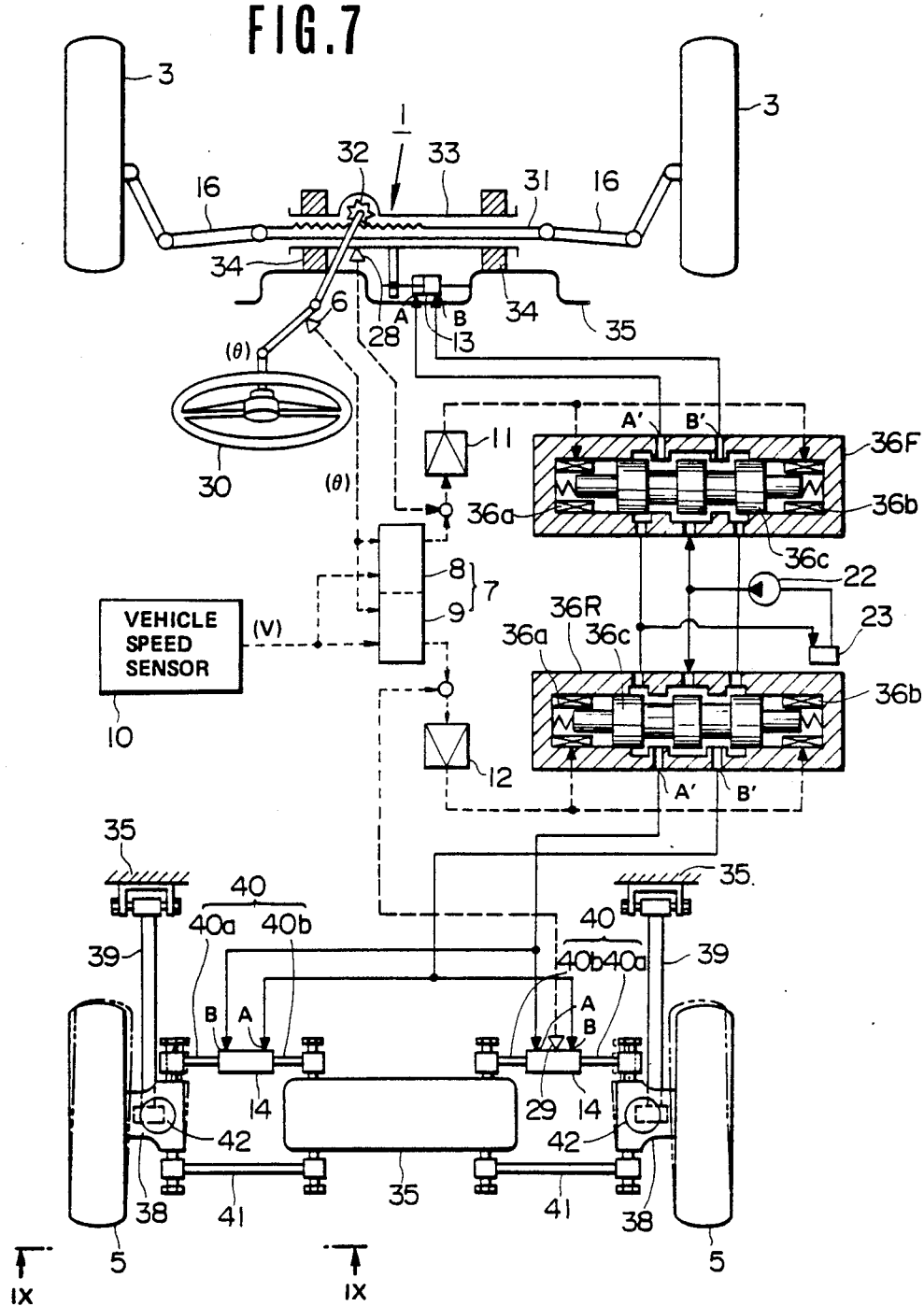
FIG. 7 is a schematic plan view of the system of the second embodiment.

FIG. 7 shows the control system of FIG. 6 concretely. The steering gear 1 of the front wheel steering mechanism has a rack 31 interposed between right and left steering linkages 16 of the right and left front wheels 3, and a pinion 32 which is rotated by a steering wheel 30 and in engagement with the rack 31. A steering gear housing 33 encloses the rack 31 and pinion 32. The steering input $\Theta$ applied to the steering wheel 30 by the driver causes the pinion 32 to rotate, and the rack 31 to move longitudinally (toward the right or left front wheel 3), so that the front wheels 3 are steered. In order to apply a control action of the control circuit 8 to the steering mechanism, the gear housing 33 is supported on a vehicle body 35 through rubber bushes 34, and made longitudinally movable together with the rack 31, relative to the vehicle body, toward the right or left front wheel 3, by the front wheel actuator 13 of a hydraulic type.

Figure 8:
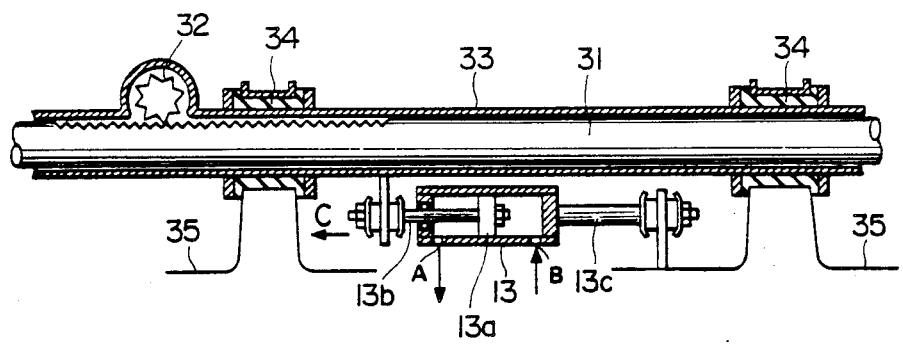
FIG. 8 is a detailed sectional view of a front wheel steering mechanism shown in FIG. 7.

As shown in FIG. 8, the front wheel actuator 13 has a piston 13a which separates two working chambers having ports A and B, respectively. The actuator 13 further has a piston rod 13b connected with the gear housing 33. The cylinder of the actuator 13 is connected with the vehicle body 35 through a rod 13c. The actuator 13 is controlled by a front electromagnetic spool valve 36F having solenoids 36a and 36b, and a spool 36c. The spool 36c is held at a neutral position shown in FIG. 7 by springs when both of the solenoids 36a and 36b are deenergized. The valve 36F is connected with an oil pump 22 and a reservoir 23. The valve 36F has a port A' connected with the port A of the front wheel actuator 13, and a port B' connected with the port B of the actuator 13.

The solenoid 36a or 36b is energized selectively by the electric signal indicative of the corrective steering angle $\delta_1'$ of the front wheels, which is sent through the amplifier 11 from the front wheel steering angle control circuit 8 responsive to the steering input $\Theta$ sensed by the steering sensor 6 and the vehicle speed V sensed by the vehicle speed sensor 10. When the solenoid 36a is energized and the spool 36c of the valve 36F is moved left in FIG. 7, the fluid pressure is supplied through the port B', and accordingly the piston 13a of the actuator 13 is moved left as shown by an arrow C in FIG. 8. Therefore, the gear housing 33 causes the rubber bushes 34 to deflect, and moves left in FIG. 7, so that the front wheels 3 are steered right. When the solenoid 36b of the valve 36F is energized and the spool 36c is moved right in FIG. 7, the fluid pressure is supplied through the port A' so that the front wheels 3 are steered left. The control circuit 8 controls the direction and amount of the corrective steering action of the actuator 13. A front wheel steering angle sensor 28 senses the corrective control action of the actuator 13. The valve 36F is so arranged that the actual amount sensed by the sensor 28 is maintained equal to the desired corrective steering angle $\delta_1'$.

Figure 9:
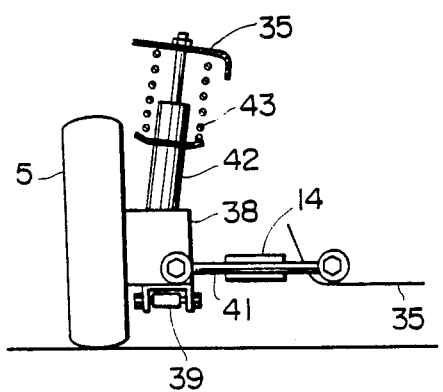
FIG. 9 is an elevation of a rear wheel steering mechanism as viewed from a line IX—IX of FIG. 7 in a direction shown by arrows.

The rear wheel steering system of FIG. 7 has right and left wheel support member 38 which, respectively, support the rear wheels 5 rotatably. Each of the wheel support members 38 is supported on the vehicle body 35 by a radius rod 39 in the fore and aft direction of the vehicle, and by a pair of parallel lateral rods 40 and 41 in the lateral direction of the vehicle. As shown in FIG. 9, a strut assembly 42 having a suspension spring 43 extends upwardly from each wheel support member 38 to the vehicle body 35.

Figure 10:
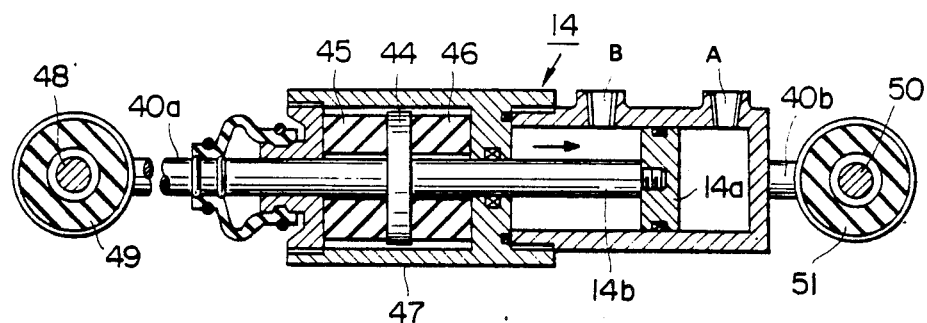
FIG. 10 is a detailed sectional view of a rear wheel actuator shown in FIG. 9.

The lateral rod 40 of each rear wheel is provided with the actuator 14 of a hydraulic cylinder type so that a toe angle of the rear wheel 5 can be varied. FIG. 10 shows the actuator 14 for the left rear wheel 5. As shown in FIG. 10, the actuator 14 has a piston 14a separating two working chambers having, respectively, ports A and B, and a piston rod 14b. The lateral rod 40 is divided into an outer portion 40a and an inner portion 40b. The piston rod 14b is placed between the outer and inner lateral rod portions 40a and 40b so that they are collinear. A circular disc 44 is interposed between the outer lateral rod portion 40a and the piston rod 14b coaxially. The piston rod 14b, the disc 44 and the outer lateral rod portion 40a are fixed together so as to form a single integral unit. The cylinder of the actuator 14 is fixed with the inner lateral rod portion 40b. Annular rubber bushes 45 and 46 are disposed on both sides of the disc 44. A tubular case 47 is fixed with the cylinder of the actuator 14. The tubular case 47 encloses the rubber bushes 45 and 46 so that they are axially immovable.

An outboard end of the outer lateral rod portion 40a is connected with the wheel support member 38 through a rubber bush 49 and a pin 48 fixed to the support member 38 as an outboard end of the lateral rod 41. An inboard end of the inner lateral rod portion 40b is connected with the vehicle body 35 through a rubber bush 51 and a pin 50 fixed to the vehicle body 35 as an inboard end of the lateral rod 41.

The left and right actuators 14 for the left and right rear wheels 5 are controlled by a rear electromagnetic spool valve 36R similar to the front valve 36F. A port A' of the rear valve 36R is connected to the outboard port B of the left actuator 14 for the left rear wheel 5 and the inboard port A of the right actuator 14 for the right rear wheel 5. A port B' of the rear valve 36R is connected to the inboard port A of the left actuator 14 for the left rear wheel 5, and the outboard port B of the right actuator 14 for the right rear wheel 5.

The electric signal indicative of the rear wheel steering angle $\delta_2$, produced by the control circuit 9 is sent through the amplifier 12 to the valve 36R. A solenoid 36a or a solenoid 36b of the valve 36R is selectively energized by the signal of the circuit 9. When the solenoid 36b is energized and the spool 36c is moved right in FIG. 7, the valve 36R supplies the fluid pressure through the port A' to the outboard port B of the left rear wheel actuator 14 and the inboard port A of the right rear actuator 14. Therefore, the piston rod 14b of the left rear wheel actuator 14 moves right in FIG. 10 and compresses the rubber bush 46, so that the left rear wheel actuator 14 shortens. Consequently, the left rear wheel 5 is steered to a position shown by a two-dot chain line in FIG. 7. At the same time, the right rear actuator 14 is lengthened, so the right rear wheel 5 is steered in the same direction as the left rear wheel 5. When the solenoid 36a of the valve 36R is energized, the valve 36R moves its spool 36c left in FIG. 7 and supplies the fluid pressure through the port B' to the inboard port A of the left rear wheel actuator 14 and the outboard port B of the right rear wheel actuator 14. Therefore, the right rear wheel 5 is steered to a position shown by a two-dot chain line in FIG. 7 by a contraction of the right rear wheel actuator 14, and at the same time the left rear wheel 5 is steered in the same direction by an expansion of the left rear wheel actuator 14. A rear wheel steering angle sensor 29 senses the steering angle of the rear wheels 5 by sensing a stroke of one of the actuators 14. The control circuit 9 controls steering direction and amount of the rear wheels, and the valve 36R maintains the steering angle sensed by the sensor 29 equal to the desired steering angle $\delta_2$.

Figure 11:
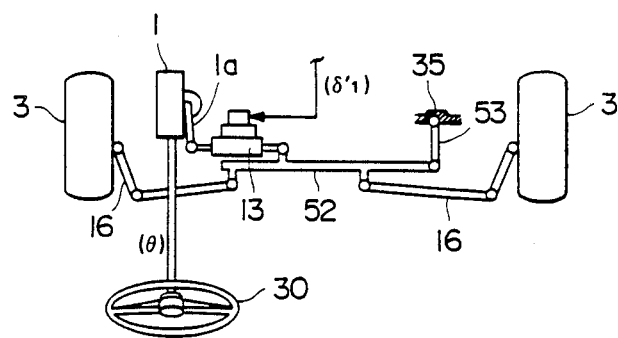
FIG. 11 is a schematic plan view showing an alternative form of the front wheel steering mechanism for the second embodiment.

It is optional to employ a front wheel steering system shown in FIG. 11 in place of the front wheel steering system shown in FIG. 7. In this example, right and left steering linkages 16 of the right and left front wheels are connected with each other by a tie rod 52. The tie rod 52 is liked to the vehicle body 35 through a link 53. The steering gear 1 of FIG. 11 is a recirculating ball type. A pitman arm 1a of the steering gear 1 is connected to the tie rod 52 through the front wheel actuator 13.

This actuator 13 is a hydraulic servo actuator. In accordance with the signal of the control circuit 8, the actuator 13 is expanded and contracted. Thus, the actuator 13 can steer the front wheels 3 in addition to a steering action of the steering gear 1. When there is no steering action of the actuator 13, the front wheels 3 are steered only by a turning movement transmitted through the steering gear 1, actuator 13, tie rod 52 and linkages 16.

Figure 12:
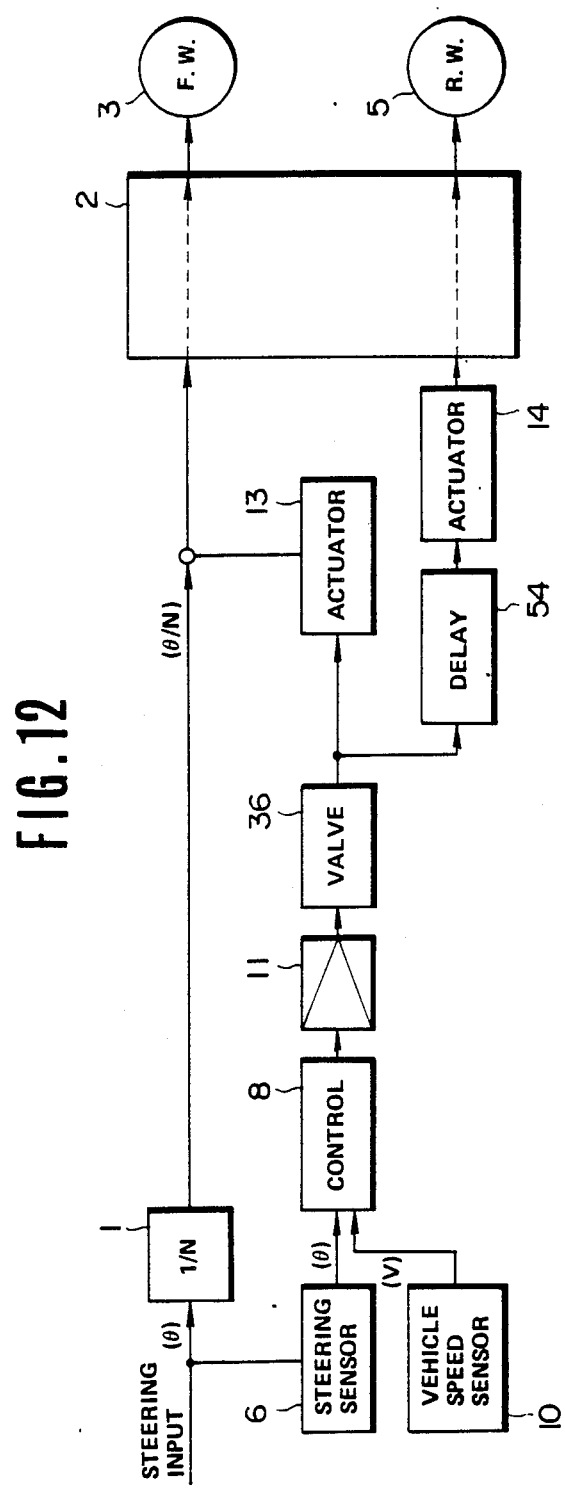
FIG. 12 is a schematic view of a four-wheel steering system of a third embodiment of the present invention.
Figure 13:
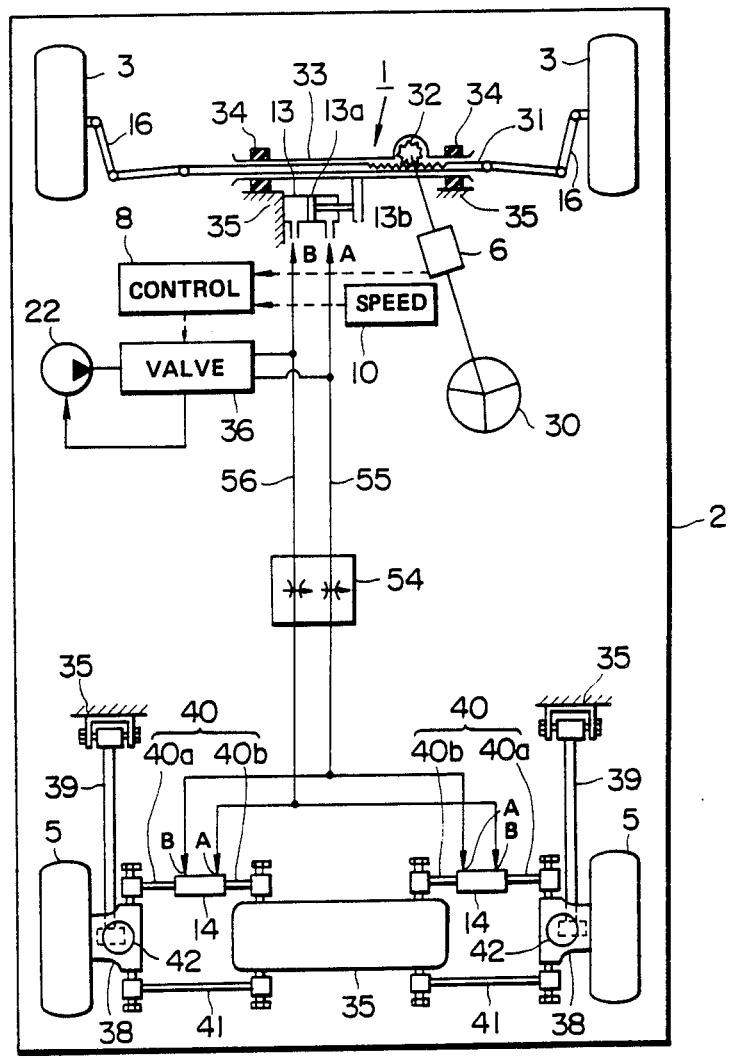
FIG. 13 is a schematic plan view of the system of FIG. 12, FIGS. 14A and 14B are diagrams showing front and rear wheel response characteristics of the third embodiment.

A third embodiment of the present invention is shown in FIG. 12. The front wheel steering system of this embodiment is the same as that of FIG. 6. The rear wheel steering system of the third embodiment is arranged to steer the rear wheels 5 by supplying the fluid pressure outputted by the electromagnetic valve 36 of the front wheel steering system, to the rear wheel actuator 14 through a delay means 54 such as an orifice. As shown in FIG. 13, the front wheel steering mechanism, the front wheel actuator 13, and the right and left rear wheel actuators 14 of the third embodiment are arranged in the same manners those shown in FIGS. 7 to 10. In the third embodiment, however, the port A of the front wheel actuator 13 is connected by a conduit 55 with the outboard port B of the left rear wheel actuator 14, and the inboard port A of the right rear wheel actuator 14. The port B of the front wheel actuator 13 is connected by a conduit 56 with the inboard port A of the left rear wheel actuator 14, and the outboard port B of the right rear wheel actuator 14. The delay means 54 has an orifice disposed in the conduit 55 for restricting the flow through the conduit 55 and an orifice disposed in the conduit 56 for restricting the flow through the conduit 56.

Figure 14A:
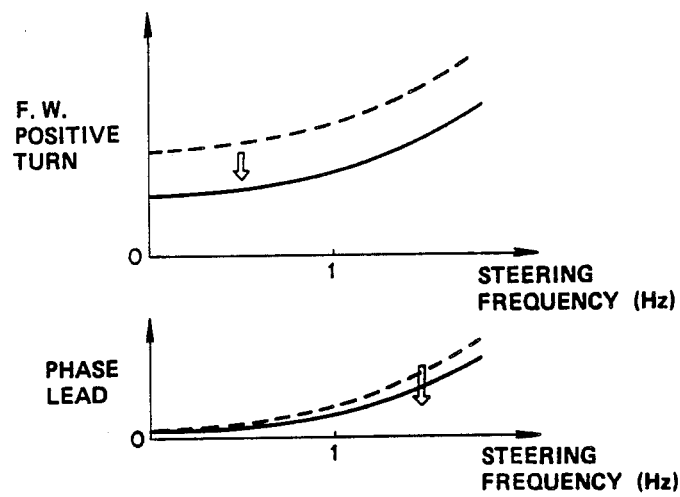
Figure 14B:
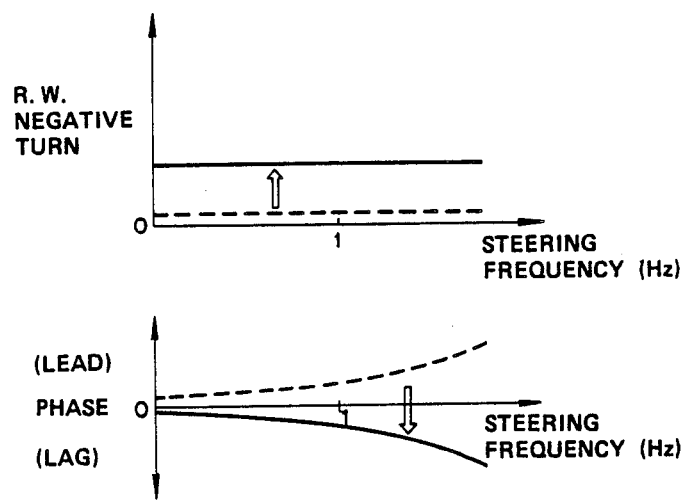

In the third embodiment, the front wheels are steered in accordance with the characteristics shown in FIG. 14A, which are similar to the characteristics of FIG. 3A for the preceding embodiments. However, the response characteristics of the rear wheels of the third embodiment shown in FIG. 14B are different from those of the preceding embodiments. As shown in FIG. 14B, the steering direction of the rear wheels is always negative. The rear wheels are steered in the negative direction even when the vehicle speed is low. The amount of a turn of the rear wheels in the negative direction is increased as the vehicle speed increases as shown by an arrow in FIG. 14B. However, this amount is not increaed even in a high steering frequency range because there is provided the delay means 54. The phase of the rear wheel response is equal to the phase lead of the front wheels minus a phase lag due to the delay means 54. By making the opening size of the orifices of the delay means 54 sufficiently small, it is possible to obtain such a characteristic that the phase difference is changed from the phase lead shown by a broken line to the phase lag shown by a solid line in FIG. 14B when the vehicle speed becomes high, as shown by an arrow in FIG. 14B.

Figure 15:
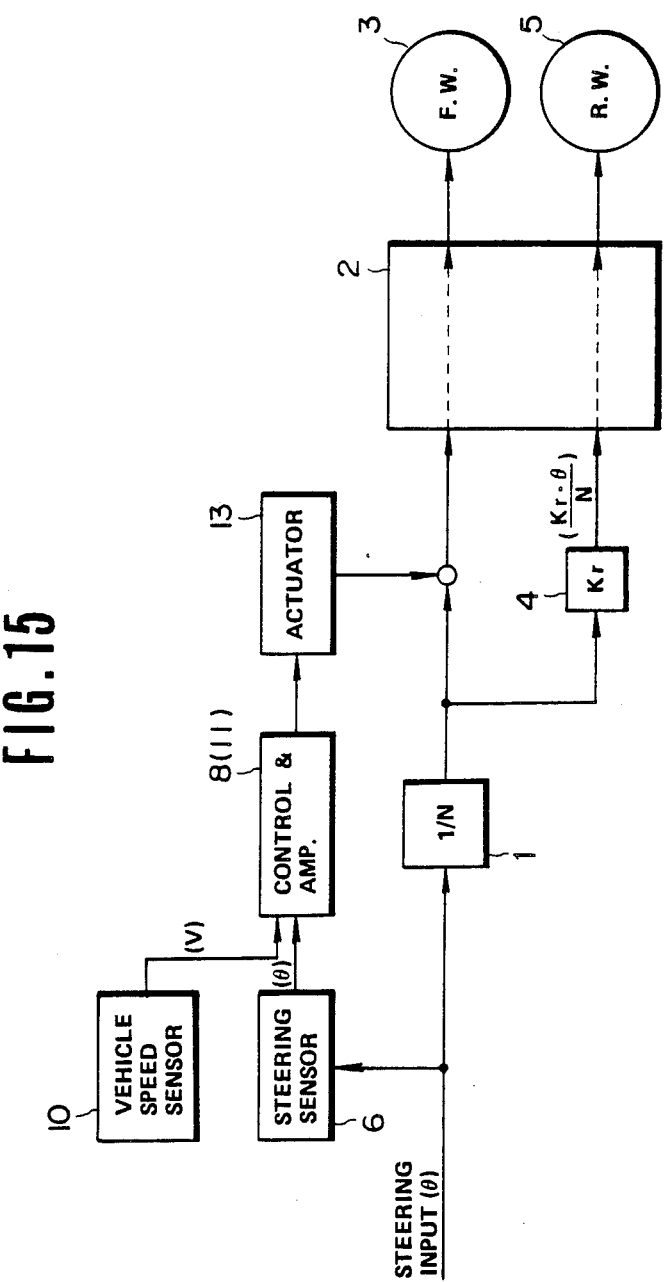
FIG. 15 is a schematic view of a four-wheel steering system of a fourth embodiment of the present invention.
Figure 16:
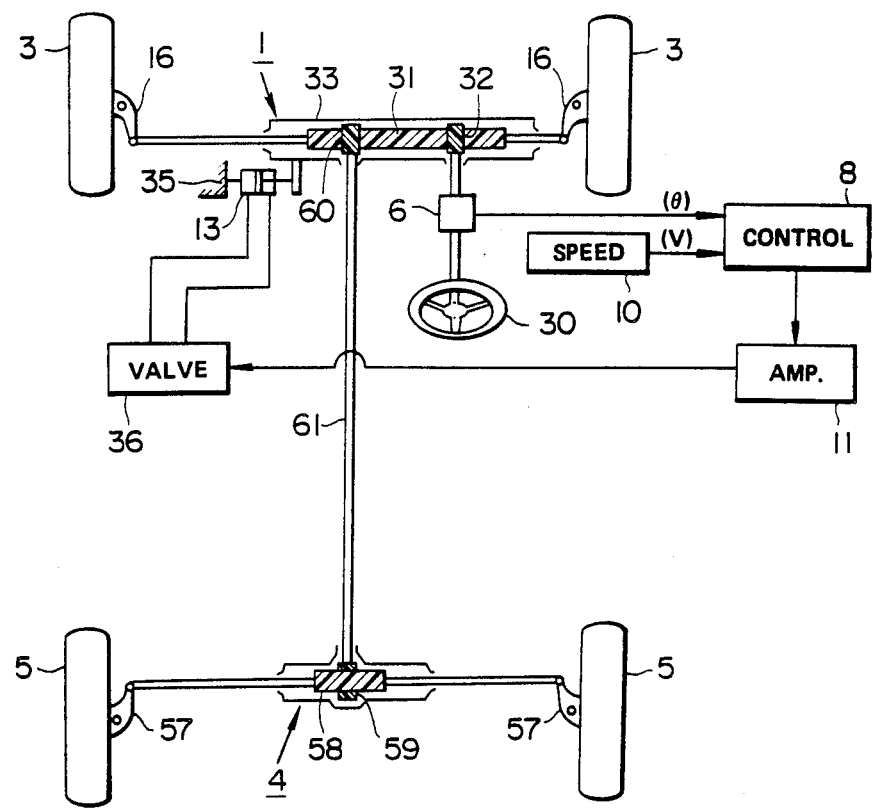
FIG. 16 is a schematic plan view of the system of FIG. 15, FIGS. 17A and 17B are diagrams showing front and rear wheel response characteristics of the fourth embodiment.

A fourth embodiment of the present invention is shown in FIG. 15. The front wheel steering system of the fourth embodiment is the same as those of the second and third embodiments. The rear wheel steering system consists of a rear wheel steering mechanism 4 similar to that of FIG. 1. The system of the fourth embodiment is shown concretely in FIG. 16. Like the second and third embodiments, the front wheel steering system of this embodiment has the rack and pinion type steering gear 1 and the front wheel actuator 13 for moving the steering gear housing 33. The front wheels are controlled by the actuator 13, control circuit 8, amplifier 11, electromagnetic spool valve 36 in the same manner as explained with reference to FIGS. 6 to 8. The rear wheel steering mechanism 4 has right and left steering linkages 57 supporting the right and left rear wheels 5, respectively, so that the rear wheels are steerable. The rear wheel steering mechanism 4 further has a rack 58 interposed between the right and left linkages 57 for connecting both, and a pinion 59 engaging with the rack 58. The pinion 59 is fixed to one end of the shaft 61. The other end of the shaft 61 has a pinion 60 fixed thereto. The pinion 60 is engaged with the rack 31 of the front wheel steering gear 1. Therefore, a turning motion of the steering wheel 30 is transmitted through the rack 31, pinion 60, shaft 61, pinion 59, rack 58, and steering linkages 57 to the rear wheels. The rear wheel steering mechanism 4 is so arranged that the rear wheels 5 are steered in the same direction with respect to the longitudinal line of the vehicle as the front wheels 3.

Figure 17A:
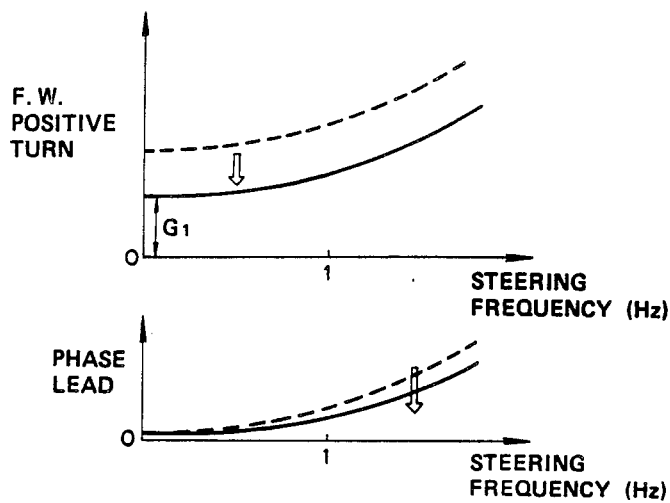
Figure 17B:
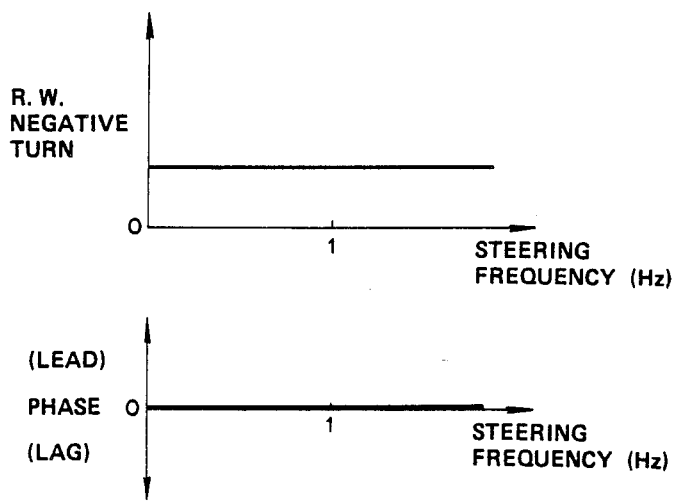

The response characteristics of the fourth embodiment are shown in FIGS. 17A and 17B. The response characteristics of the front wheels are similar to those of the preceding embodiments, as shown in FIG. 17A. The rear wheel response characteristics is shown in FIG. 17B. The rear wheels 5 are steered only in the negative direction which is the same direction as the steered direction of the front wheels 3. The amount of a turn of the rear wheels 5 in the negative direction is affected by neither the vehicle speed nor the steering frequency, but it is determined only by the steering input. The phase difference of the rear wheels is always zero because of the construction of the rear wheel steering mechanism 4.

Thus, according to the present invention, the transfer characteristic (the transfer function $X_1(s)$) between the steering input and the front wheel steering angle, and the transfer characteristic (the transfer function $X_2(s)$) between the steering input and the rear wheel steering angle are differentiated from each other so as to improve the directional control and stability of the vehicle. Therefore, the present invention makes it possible to obtain an ideal flat characteristic of the gain of vehicle (which is a ratio of the raw rate or lateral acceleration of the vehicle to the steering input), and to make the phase lag of the vehicle (which is a time delay between the steering input and the yaw rate or lateral acceleration of the vehicle) substantially zero.

What is claimed is:

1. A steering system for a vehicle having at least steerable front wheels comprising:
   steering input means comprising a steering wheel and a steering sensor for determining a steering input which is an angular displacement of the steering wheel,
   front steering means connected with the steering input means for determining a first output angle from the steering input in accordance with a first transfer characteristic between the steering input and the first output angle and controlling a steering angle of the front wheels so that the steering angle of the front wheels is maintained equal to the first output angle, the first transfer characteristic being a function of steering frequency such that both the gain and phase difference of the first transfer characteristic vary as the steering frequency varies, and
   rear steering means connected with the steering input means for determining a second output angle from the steering input in accordance with a second transfer characteristic between the steering input and the second output angle which is different from the first transfer characteristic, and controlling a steering angle of the rear wheels so that the steering angle of the rear wheels is maintained equal to the second output angle.

2. A steering system according to claim 1 wherein the first and second transfer characteristics are so chosen as to provide different frequency response characteristics.

3. A steering system according to claim 1 further comprising a vehicle speed sensor for sensing a speed of the vehicle, and wherein the first transfer characteristic is a function of the vehicle speed and a steering frequency.

4. A steering system according to claim 3 wherein the gain of the first transfer characteristic increase as the steering frequency increases, and decreases as the vehicle speed increases.

5. A steering system according to claim 4 wherein the first transfer characteristic is chosen so that the phase of the first output angle leads the phase of the steering input, and that the phase lead of the first output angle relative to the steering input increases as the steering frequency increases, and decreases as the vehicle speed increases.

6. A steering system according to claim 5 wherein the second transfer characteristic is chosen so that the phase difference between the steering input and the second output angle is equal to zero or negative so that the second output angle lags the steering input, at least in a high vehicle speed range, and
wherein the rear steering means turns the rear wheels in the same direction as the front wheels at least in the high vehicle speed range.

7. A steering system according to claim 3 wherein the front steering means comprises front control means connected with the steering sensor and the vehicle speed sensor for determinging the first output angle, and front actuating means for controlling the steering angle of the front wheels, and the rear steering means comprises rear control means connected with the steering sensor and the vehicle speed sensor for determining the second output angle and rear actuating means for controlling the steering angle of the rear wheels.

8. A steering system according to claim 3 wherein and the front steering means comprises a front steering mechanism for mechanically transmitting a turning movement of the steering wheel to the front wheels in such a relation that the steering angle of the front wheels is altered approximately in proportion to the steering input, front control means connected with the steering sensor and the vehicle speed sensor for determining the first output angle in accordance with the first transfer characteristic and producing a signal indicative of the first outut angle, and front actuating means for actuating the front steering mechanism to correct the steering angle of the front wheels so that the steering angle of the front wheels is maintained equal to the first output angle.

9. A steering system according to claim 8 wherein the rear steering means comprises rear control means connected with the steering sensor and the vehicle speed sensor for determining the second output angle in accordance with the second transfer characteristic and producing an electronic signal indicative of the second output angle, and rear actuating means for controlling the steering angle of the rear wheels in response to the signal of the rear control means.

10. A steering system according to claim 9 wherein the second transfer characteristic is chosen so that the rear wheels are turned in a positive direction opposite to a direction of the front wheels in a low vehicle speed range and in a negative direction which is the same as the direction of the front wheels in a high vehicle speed range, and that the phase of the second output angle leads the phase of the steering input in the low vehicle speed range and lags the phase of the steering input in the high vehicle speed range.

11. A steering system according to claim 10, wherein the gain of the second transfer characteristic increases as the steering frequency increases at least in the high vehicle speed range.

12. A steering system according to claim 8, wherein the rear steering means comprises delay means connected with the front steering means for transmitting a signal indicative of the first output angle from the front steering means with a predetermined time delay, and rear actuating means connected with the delay means for controlling the steering angle of the rear wheels in accordance with the signal transmitted by the delay means.

13. A steering system according to claim 12, wherein the rear steering means turns the rear wheels only in a negative direction which is the same direction as the front wheels are turned.

14. A steering system according to claim 13, wherein the second transfer characteristic is so determined by the delay means that the phase of the second output angle leads the phase of the steering input in a low vehicle speed range and lags the phase of the steering input in a high vehicle speed range.

15. A steering system according to claim 13, wherein the delay means takes the form of a fluid flow restrictor having an orifice, the front actuating means comprises a front hydraulic actuator for altering the steering angle of the front wheels and a pressure control valve for controlling a hydraulic fluid pressure operating the front hydraulic actuator, and the rear actuating means comprises at least one rear hydraulic actuator for altering the steering angle of the rear wheels, the rear hydraulic actuator being fluidly connected with the front hydraulic actuator through the orifice of the delay means in such a manner that the rear wheels are steered in the same direction as the front wheels.

16. A steering system according to claim 15, wherein the second transfer characteristic determined by the delay means is such that the gain remains substantially constant as the steering frequency increases.

17. A steering system according to claim 8, wherein the rear steering means comprises a rear steering mechanism for mechanically transmitting a turning movement of the steering wheel to the rear wheels in such a relation that the steering angle of the rear wheels is altered approximately in proportion to the steering input, and that the rear wheels are steered in the same direction as the front wheels.

18. A steering system according to claim 17, wherein the second transfer characteristic is determined only by the rear steering mechanism so that the phase difference remains substantially equal to zero and the gain remains substantially constant irrespective of changes of the steering frequency and the vehicle speed.

19. A steering system according to claim 3, further comprising characteristic adjusting means for changing the first and second transfer characteristics so as to vary a yaw rate gain of the vehicle.

20. A steering system according to claim 7 wherein the front actuating means comprises right and left front steering linkages for supporting the right and left front wheels so that the front wheels are steerable, and a front hydraulic actuator connected between the right and left front steering linkages, and the rear actuating means comprises right and left rear steering linkages for supporting the right and left rear wheels so that the rear wheels are steerable, and a rear hydraulic actuator connected between the right and left rear steering linkages.

21. A steering system according to claim 8, wherein the front steering mechanism comprises a steering gear assembly which comprises a pinion rotated by the steering wheel, a rack which engages with the pinion and is capable of steering the front wheels, and a gear housing enclosing the rack and pinion, the gear housing being supported on a body of the vehicle through rubber bushes so that the gear housing is movable longitudinally, and wherein the front actuating means comprises a front hydraulic actuator comprising a cylinder fixed to the vehicle body and a piston connected with the gear housing for moving the gear housing longitudinally.

22. A steering system according to claim 20, wherein the rear steering means comprises a rear actuating means comprising a right pair of first and second lateral rods extending along a lateral line of the vehicle and connecting the right rear wheel to the vehicle body, and a left pair of first and second lateral rods extending along the lateral line of the vehicle and connecting the left rear wheel to the vehicle body, the first lateral rod of each pair being divided into an inner rod portion and an outer rod portion, the rear actuating means further comprising a right rear hydraulic actuator disposed between the inner and outer rod portions of the first lateral rod of the right pair so that the length of the first lateral rod is variable, and a left rear hydraulic actuator disposed between the inner and outer rod portions of the first lateral rod of the left pair so that the length of the first lateral rod is variable, each of the rear actuators comprises a cylinder fixed to the inner rod portion, a piston separating two working fluid chambers, and a piston rod which is fixed with the piston and the outer rod portion, and formed with an outerward flange interposed between two rubber bushes so that the flange deflects one of the rubber bushes when the piston rod moves axially.

23. A steering system according to claim 8, wherein the front actuating means comprises a front hydraulic actuator, and the front steering mechanism comprises a recirculating ball type steering gear having a pitman arm, right and left steering linkages for supporting the right and left front wheels, and a tie rod connecting the right and left steering linkages, the tie rod being connected with the pitman arm through the front hydraulic actuator.

24. A steering system according to claim 1 wherein the gain of the first transfer characteristic increases as the steering frequency increases and the first transfer characteristic is chosen so that the phase of the first output angle leads the phase of the steering input and that the phase lead of the first output angle relative to the steering input increases as the steering frequency increases.

* * * * *